United States Patent
Ofir et al.

(10) Patent No.: US 8,736,992 B2
(45) Date of Patent: May 27, 2014

(54) WAVELENGTH-SPECIFIC WIDE IMPINGING ANGLE LIMITER

(75) Inventors: Yuval Ofir, Modiin (IL); Ariela Donval, Rosh-Haayin (IL); Moshe Oron, Rehovot (IL); Doron Nevo, Ra'anana (IL)

(73) Assignee: KiloLambda Technologies, Inc., Tel-Aviv (IL)

( * ) Notice: Subject to any disclaimer, the term of this patent is extended or adjusted under 35 U.S.C. 154(b) by 56 days.

(21) Appl. No.: 13/468,220

(22) Filed: May 10, 2012

(65) Prior Publication Data

US 2012/0287522 A1   Nov. 15, 2012

Related U.S. Application Data

(60) Provisional application No. 61/484,844, filed on May 11, 2011.

(51) Int. Cl.
*G02B 5/20*   (2006.01)

(52) U.S. Cl.
USPC .. 359/890; 359/887; 351/159.61; 351/159.65

(58) Field of Classification Search
USPC .......... 359/588, 590, 723, 887, 890; 356/403; 351/159.61, 159.65, 159.73; 396/580
See application file for complete search history.

(56) References Cited

U.S. PATENT DOCUMENTS

| | | | |
|---|---|---|---|
| 7,633,681 B2 * | 12/2009 | Marusi et al. | 359/587 |
| 2004/0240067 A1 * | 12/2004 | Marusi et al. | 359/588 |
| 2007/0053050 A1 * | 3/2007 | Kumar et al. | 359/241 |

FOREIGN PATENT DOCUMENTS

| | | |
|---|---|---|
| EP | 1467238 | 10/2004 |
| IL | 147554 | 11/2005 |
| JP | 2004-115104 | 11/2004 |
| WO | 03/058338 | 7/2003 |

OTHER PUBLICATIONS

Abhijit Sarkar, "Multifunctional Composite Materials for Optional Power Limiting Applications in Space Environments," Journal of Nanophotonics, vol. 3, No. 1, Nov. 5, 2009, pp. 1-14.

Raz Gvishi, "Resonance Energy Transfer in a Novel Two-Component System: Two-Photon Fluorophore and a Photo-Chromic Acceptor Molecule," Proc. Spie 5724, Organic Photonic Materials and Devices VII, vol. 5724, Apr. 11, 2005, pp. 13-20.

Hyunmin Song, "Layered Polymeric Optical Systems Using Continuous Coextrusion," Proc. Spie 7467, Nanophotonics and Macrophotonics for Space Environments III, vol. 7467, Sep. 9, 2009, pp. 1-12.

European Search Report for European Application No. 12167482.4, dated Oct. 9, 2012, 9 pages.

Auzel, Francois "Upconversion and Anti-Stokes Processes with f and d Ions in Solids", 2004, pp. 139-173, 35 pages.

Jan W. Stouwdam and Frank C. J. M van Veggel, "Near-infrared Emission of Redispersible $Er^{3+}$, $Nd^{3+}$, and $Ho^{3+}$ Doped $LaF_3$ Nanoparticles", Mar. 28, 2002, 5 pages.

* cited by examiner

*Primary Examiner* — Evelyn A Lester
*Assistant Examiner* — William Alexander
(74) *Attorney, Agent, or Firm* — Nixon Peabody LLP

(57) ABSTRACT

An impingement angle-independent wavelength-specific limiter includes a stack of wavelength-specific limiters configured to limit impinging light having a plurality of different wavelengths. The stack includes a plurality of wavelength-specific limiters. Each one of the plurality of wavelength-specific limiters is activated by a corresponding wavelength of the impinging light and is configured to limit the corresponding wavelength of the impinging light.

15 Claims, 3 Drawing Sheets

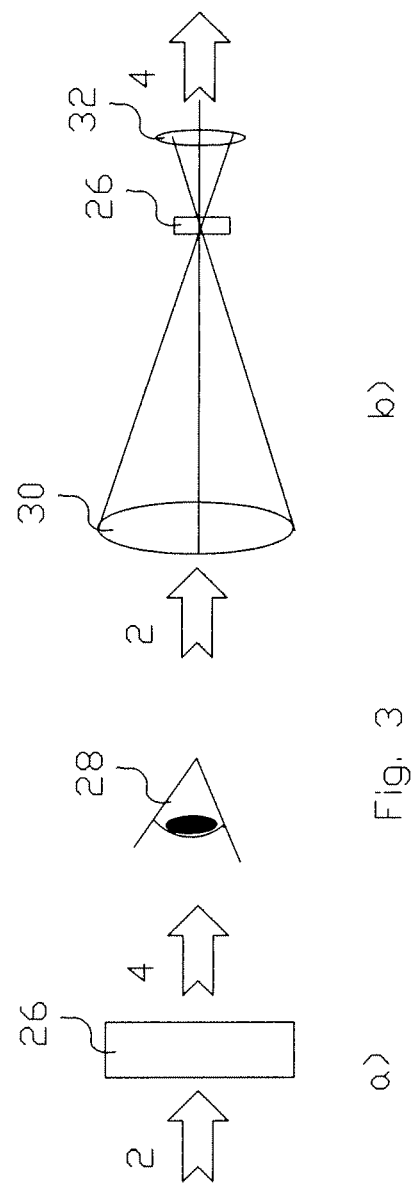

WAVELENGTH-SPECIFIC WIDE IMPINGING ANGLE LIMITER

PRIORITY CLAIM

This application claims priority to U.S. Provisional Application No. 61/484,844 filed May 11, 2011, the contents of which are hereby incorporated by reference herein in its entirety.

FIELD OF THE INVENTION

The present disclosure relates to optical power-limiting devices, and more particularly, to wavelength-specific wide impinging-angle optical power-limiting passive devices and to methods for limiting wavelength-specific wide impinging-angle optical power transmission through filters, wide impinging-angle optical power reflection mirrors, using absorption changes in a stack of photochromic materials, having the property of being activated by and blocking the same specific wavelength.

The present disclosure also relates to the production of filters, mirrors and other optical articles protected against laser dazzling, where the dazzling laser is blue, green, red or any specific wavelength.

BACKGROUND OF THE INVENTION

Many hand-held lasers are used as laser pointers in lecture rooms, laser shows and various laser games. In some cases these lasers are used for intentional dazzling of eyes and optical sights. These lasers have several specific wavelengths, such as a 535 nm wavelength green laser, the second harmonic of the widely used Neodymium laser and other lasers in the red and the blue ranges.

Many lasers have powers that are permanently or temporarily damaging to the eye and/or various electronic sensors. These lasers can impinge on the sensor from various directions and angles. In order to shield against them, a safety filter is needed to protect the eye and/or sensor.

The conventional solution for a wavelength-specific filter is a thin film interference filter. These filters are strongly dependent on the specific angle of impingement of the damaging light. Moreover, these filters do not transmit light in a wide spectral band around the designed wavelength, to accommodate for the angles of impingement that are not perpendicular to the surface. Thus, the use and applicability of these filters are limited. Thin film interference filters designed to block three known wavelengths, e.g., blue, green and red, at angles up to 30° will allow only about 30% of the visible light to pass and thus will result in a poor image.

Prior work has dealt with high-power lasers. For example, an optical limiter, Israeli Patent 147554, describes various ways to realize a limiting device. Other examples include EP1467238 and application JP2004-115104 and patents disclosed in them, teaching on an optical power limiter that is based on thermally changed scattering effect of an element that combines a mixture of particles in a matrix.

There is an unaddressed need in the art for an impingement angle-independent, wavelength-specific limiter for these applications. The present disclosure addresses these needs and provides a limiter, designed for a plurality of specific wavelengths.

Up-conversion refers to nonlinear optical processes characterized by the successive absorption of two or more pump photons via intermediate long-lived energy states followed by the emission of the output radiation at a shorter wavelength than the pump wavelength. Since then, conversion of infrared radiation into the visible range has generated much of the interest in up-conversion research. The knowledge gained thus far has allowed the development of effective optical devices such as infrared quantum counter detectors, temperature sensors, and compact solid-state lasers. Despite its remarkable potential utility, the practical use of up-conversion has been extremely limited.

Nanoscale manipulation, e.g., of lanthanide-doped up-conversion nano-crystals, leads to important modification of their optical properties in excited-state dynamics, emission profiles and up-conversion efficiency. For example, the reduction in particle size provides the ability to modify the lifetime of intermediate states. The control of spatial confinement of dopant ions within a nano-scopic region can lead to marked enhancement of a particular wavelength emission as well as generation of new types of emissions.

In many applications, there is insufficient UV and short wave visible light radiation to actuate the photochromic material. The addition of up-conversion materials enables the in-situ generation of UV and/or short wave visible light that in turn can trigger photochromic materials and devices in these applications.

The current disclosure relates to absorption of impinging angle-independent laser light in up-converting materials, and the use of the re-emitted light to tint a photochromic dye, which in turn can limit the transmission of the exciting laser.

SUMMARY OF THE INVENTION

One aspect of the present disclosure relates to an impingement angle-independent wavelength-specific limiter including a stack of wavelength-specific limiters configured to limit impinging light having a plurality of different wavelengths. The stack includes a plurality of wavelength-specific limiters. Each one of the plurality of wavelength-specific limiters is activated by a corresponding wavelength of the impinging light and is configured to limit the corresponding wavelength of the impinging light.

Another aspect of the present disclosure relates to a method of limiting impinging light. The method includes passing impinging light including first, second and third wavelengths through an optical limiter, wherein at least one of the first, second or third wavelength has a power above a predetermined threshold. The first wavelength activates a first wavelength specific limiter which limits the first wavelength of the impinging light. The second wavelength activates a second wavelength specific limiter which limits the second wavelength of the impinging light. The third wavelength activates a third wavelength specific limiter which limits the third wavelength of the impinging light. The limiter is configured to limit only those wavelengths of the impinging light that are above a predetermined threshold. The limiting is independent of the impingement angle of the impinging light.

Another aspect of the present disclosure relates to an impingement angle-independent wavelength-specific limiter. The limiter includes a stack of wavelength-specific limiters configured to limit impinging light having a plurality of different wavelengths. The stack includes a first wavelength-specific limiter activated by a first wavelength of the impinging light and configured to limit the first wavelength of the impinging light. The stack also includes a second wavelength-specific limiter activated by a second wavelength of the impinging light and configured to limit the second wavelength of the impinging light. The stack additionally includes a third wavelength-specific limiter activated by a third wavelength of the impinging light and configured to limit the third wavelength of the impinging light. Each one of the first, second and third wavelength has an intensity above a predetermined threshold.

BRIEF DESCRIPTION OF THE DRAWINGS

The invention will now be described in connection with certain preferred embodiments with reference to the following illustrative figures so that it may be more fully understood. With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

FIGS. 3a and 3b are diagrammatic illustrations of impingement angle-independent wavelength-specific limiters placed (a) in front of an eye or optical sight and (b) close or in the focus of an optical sight.

DETAILED DESCRIPTION OF THE INVENTION

Figure 1:
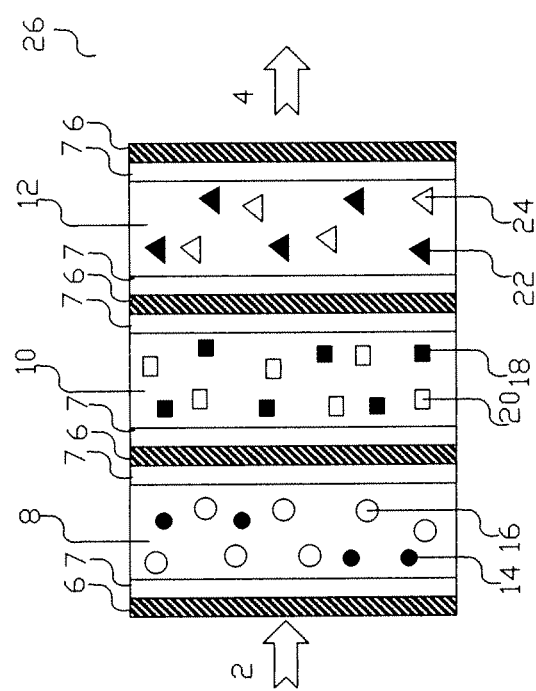
FIG. 1 is a partially diagrammatic cross-section of an impingement angle-independent, wavelength-specific limiters stack, including layers of wavelength-specific limiters separated by UV-reflecting layers and UV-absorbing layers that reflect and absorb the up-converted light.

FIG. 1 illustrates an impingement angle-independent, wavelength-specific limiters stack 26 that includes layers 8, 10 and 12 of wavelength-specific limiters separated by reflecting layers 7 and absorbing layers 6 that are absorbing for the up-converted light. The impinging light 2 consists of the whole spectrum and, in addition, a strong part, e.g., a 535 nm-wavelength green laser, the second harmonic of the widely used Neodymium laser. The weak part of the spectrum passes unchanged, whereas the green strong light is absorbed in up-converting particles 14, inside composition layer 8, emitting UV light that is absorbed by photochromic material 16. Material 16, when excited by UV light, becomes green laser power absorbing, and thus reduces the 535 nm-wavelength green laser power, effectively limiting it.

Figure 2:
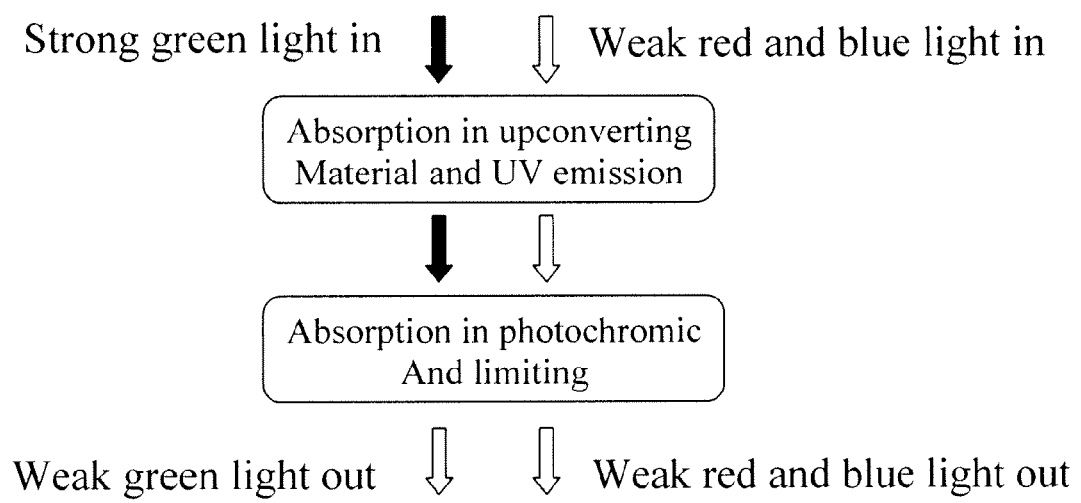
FIG. 2 is a diagrammatic illustration of the process taking place in the stack elements of the impingement angle-independent wavelength-specific limiter.

A similar process takes place for blue laser at composition 10, where the blue strong light is absorbed in up-converting particles 18, emitting UV light that is absorbed by photochromic material 20. Material 20, when excited by UV light, becomes blue laser power absorbing, and thus reduces the blue wavelength laser power, or limits it. The red strong light is treated in composition layer 12 where the red strong light is absorbed in up-converting particles 22, emitting UV light that is absorbed by photochromic material 24. Material 24, when excited by UV light, becomes red laser power absorbing, and thus reduces the red wavelength laser power, or limits it. The process is schematically illustrated for the green light in FIG. 2.

FIG. 3 illustrates placement options for an impingement angle-independent, wavelength-specific limiter 26. In a), the wavelength-specific limiter 26 is located in front of an eye 28 or optical sight 28. In b), the wavelength-specific limiter 26 is located close to or in the focus of an optical telescope or sight, e.g., consisting of lenses 30 and 32 having a common focus where limiter 26 can be placed.

The impingement angle-independent wavelength-specific limiter 26 of the present disclosure includes a stack of wavelength-specific limiters. Each element of the stack is activated by and limits a specific wavelength, and the stack is configured to limit a plurality of wavelengths.

The present disclosure makes use of absorption changes in a stack of photochromic materials, having the property of being activated by and limiting the same specific wavelength.

The present disclosure also makes it possible to produce safety glasses and filters to protect eyes and/or optical sights against laser dazzling in a plurality of predetermined wavelengths.

The impingement angle-independent wavelength-specific limiters stack is transparent to low light intensities and limits the high intensity, dazzling wavelength only, leaving all other parts of the wavelength spectrum unchanged. Thus, the higher intensity light is limited by the stack, while the lower intensity light is allowed to pass through the limiter unchanged.

According to another aspect of the present disclosure, the impingement angle-independent wavelength-specific limiters stack that limits the high intensities beyond a predetermined threshold, while maintaining unchanged picture quality at all other areas of the picture and spectral bands of the light.

According to another aspect of the present disclosure, the impingement angle-independent wavelength-specific limiters stack is configured to limit the high intensities beyond a predetermined threshold and to recover to full transparency after removal of the high intensity light. In other words, once any impinging light having an intensity above a predetermined threshold is removed, the limiter 26 returns back to full transparency.

According to another aspect, the impingement angle-independent, wavelength-specific limiters stack is configured to limit the high intensities at any impingement angle and its operation is independent of the impingement of the light on the filter.

According to another aspect, an impingement angle-independent wavelength-specific limiters stack is configured to limit the high intensities at any impingement angle and its operation is independent of the impingement of the light, working in a reflectance mode, fabricated by affixing the limiter layer to a mirror backing.

According to another aspect, an impingement angle-independent wavelength-specific limiters stack may be fabricated by a polymerizable composition of a matrix material, a color tint able photochromic material or a mixture of color tint able photochromic materials and up-conversion nanomaterials that convert the strong impinging light wavelength into a wavelength absorbed by the tint-able photochromic material.

According to another aspect, every element in the impingement angle-independent wavelength-specific limiters stack is separated from the other elements in the stack by an absorbing layer 6, that is absorbing the up-converted light, preserving the transparency of all the other stack elements, except the specific wavelength element designed for the high intensity applied light.

According to another aspect, every element in the impingement angle-independent wavelength-specific limiters stack 26 is separated from other elements in the stack by a layer 7 that reflects the up-converted light, and an absorbing layer 6 that is absorbing the up-converted light, as shown in FIG. 1, preserving the transparency of all the other stack elements but the specific wavelength element designed for the high intensity impinging light. It is further the object of the present invention to provide an impingement angle-independent, wavelength-specific limiters stack where the operation of the limiter is passive, where no external power is required.

According to another aspect, a matrix, a photochromic dye and green-absorbing light up-converting nanoparticles compose a green wavelength limiter. In this composition, the up-converting nanoparticles absorb green wavelength photons, which are re-emitted into the system as UV or short visible light. The re-emitted UV or short visible light activates the photochromic material in the composition, effectively tinting the layer and making it highly absorptive to green light.

According to another aspect, a matrix, a photochromic dye and red-absorbing light up-converting nanoparticles compose a red-wavelength limiter. In this composition, the up-converting nanoparticles absorb red wavelength photons, which are re-emitted into the system as UV or short visible light. The re-emitted UV or short visible light activates the photochromic material in the composition, effectively tinting the layer and making it highly absorptive to red light.

According to another aspect, a matrix, a photochromic dye and blue-absorbing light up-converting nanoparticles compose a blue-wavelength limiter. In this composition, the up-converting nanoparticles absorb green wavelength photons, which are re-emitted into the system as UV or short visible light. The re-emitted UV or short visible light activates the photochromic material in the composition, effectively tinting the layer and making it highly absorptive to blue light.

According to another aspect, a matrix, a photochromic dye and IR-absorbing light up-converting nanoparticles compose an IR-wavelength limiter. In this composition, the up-converting nanoparticles absorb IR wavelength photons, which are re-emitted into the system as UV or short visible light. The re-emitted UV or short visible light activates the photochromic material in the composition, effectively tinting the layer and making it highly absorptive to IR light.

According to another aspect, a combination of limiter layers are compiled together in a stack, e.g., a red, a green and a blue limiter, to provide a limiter for the entire visible spectrum. Each wavelength-specific limiting layer is optically separated from the rest of the wavelength-specific limiting layers by a UV-reflecting coating that effectively traps the up-converted UV light inside the specific layer, and can be further optically separated from the rest by a UV-blocking layer.

According to another aspect, a limiter layer comprises a photochromic dye, light up-converting nanoparticle additives, and fluorescence enhancer materials and structures, which enhance fluorescent emission from the up-converting nanoparticle additives. The enhancement of fluorescence from the up-converting nanoparticles is achieved through plasmonic coupling, also known as hot-spots or local field effect.

According to another aspect, a limiter layer comprises a matrix, a photochromic dye, light up-converting nanoparticle additives, fluorescence enhancer materials and structures, and environmental stabilizers and thermal conductivity enhancers.

The matrix in the photochromic compositions can be organic-based, e.g., a polymer film, a polymerizable composition, or a transparent adhesive, or inorganic-based, e.g., mineral glass, sol-gel, and any other window based material, and an inorganic-organic composite.

Various up-converting nanoparticles may be used in the photochromic compositions according to the present disclosure, such as $LaF_3$, $NaYF_4$, $LuPO_4$, $YbPO_4$, $GdOF$, $La_2(MoO_4)_3$, $YVO_4$, $ZrO_2$, $TiO_2$, $BaTiO_3$, $Lu_3Ga_5O_{12}$, $Gd_2O_3$, $La_2O_2S$ and any combination thereof where the doping ions include lanthanides such as Yb, Er, Tm, Eu, Nd, Ho and any combination thereof.

Various photochromic materials that can be used in the photochromic compositions include, but are not limited to, organic and inorganic photochromics and any combination thereof. Organic photochromic dyes can be pyrans, oxazines, fulgides, fulgimides, diarylethenes and any combination thereof. These may be a single photochromic compound, a mixture of photochromic compounds, a material comprising a photochromic compound, such as a monomeric or polymeric ungelled solution; and a material such as a monomer or polymer to which a photochromic compound is chemically bonded. Inorganic photochromics can be crystallites of silver halides, cadmium halide, copper halide and any combination thereof. Further, inorganic photochromics may become tinted in the IR, such as various vanadium oxides, tungsten oxides, doped versions of them and any combination thereof.

Various fluorescence enhancing materials can be used in the photochromic compositions to enhance fluorescence emission from the up-converting nanoparticles. The enhancement of fluorescence from the up-converting nanoparticles is achieved through plasmonic coupling, also known as hot-spots or local field effect. Examples include, but are not limited to, metallic plasmonic nanostructures such as spiked nanoparticles, hollow-shell nanoparticles, rice-like nanoparticles, nonconcentric-nanoshell nanoparticles, crescent-moon-structured nanoparticles, nanoshells composed of a dielectric core with alternating layers of metal, dielectric, metal ("nanomatryushka"), and any combination thereof.

Various environmental stabilizers that can be used in the photochromic compositions include hindered amine light stabilizer (HALS), UV absorbers, thermal stabilizers, singlet oxygen quenchers, various antioxidants, and any combination thereof.

Various thermal conductivity enhancers used to enhance the thermal conductivity of the matrix used for the photochromic compositions effectively achieve two purposes. One, heat that builds up in the optical element during the absorption of light can dissipate more easily to other elements in the system, effectively reducing the thermal degradation of both the matrix and the photochromic dye. Second, since most photochromic dyes are converted from their colored form (tinted form) to colorless form by the absorption of visible light and by heat, removing the heat element will change the equilibrium of colored and colorless molecules.

According to one aspect, the thermal conductivity of polymeric matrixes is achieved by the addition of nanoparticles, nanorods, nanowires, hollow nanoparticles, core-shell nanoparticles, spiked particles, and nanoparticles with various shapes. These may include nanoparticles of metal, metal oxide, metal nitrides, metal carbides, metal sulfides, and carbon-based nanomaterials, such as nanodiamond, diamond-like carbon (DLC), single-wall carbon nanotubes, double-wall carbon nanotubes, multiwall carbon nanotubes, and their functionalized forms, graphene, and carbon steel.

The various compositions can be polymerized, cured or fabricated in the form of nanoparticles and/or microparticles. The nanoparticles and/or the microparticles can be further dispersed in a new matrix, appropriate for forming a limiter layer.

Various nanoparticles and/or microparticles of the photochromic compositions can be further coated or encapsulated with a coating. The coating can serve a number of functions, such as protection of the core composition from oxidation or any form of degradation, blocking out harmful radiation, and changing the chemical nature of the particles (hydrophobic/hydrophilic) and hence the dispersability of the nanoparticles and/or microparticles. The coating can further be a UV-reflecting layer or multilayer that effectively traps the UV light emitted from the up-converting nanoparticles, effectively enhancing the absorption of the photochromic dye inside the nanoparticles and/or microparticles. The coating can be organic, inorganic or a composite, and in the form of a monolayer, a multilayer or a porous layer.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An impingement angle-independent wavelength-specific limiter, comprising: a stack of impingement angle-independent wavelength-specific limiters configured to limit impinging light having a plurality of different wavelengths, the stack including:
   a plurality of impingement angle-independent wavelength-specific limiters, each one of the plurality of impingement angle-independent wavelength-specific limiters being activated by a corresponding wavelength of the impinging light and being configured to limit the corresponding wavelength of the impinging light.

2. The limiter of claim 1, wherein the plurality of wavelength-specific limiters includes:
   a first wavelength-specific limiter activated by a first wavelength of the impinging light and configured to limit the first wavelength of the impinging light;
   a second wavelength-specific limiter activated by a second wavelength of the impinging light and configured to limit the second wavelength of the impinging light; and,
   a third wavelength-specific limiter activated by a third wavelength of the impinging light and configured to limit the third wavelength of the impinging light.

3. The limiter of claim 2, wherein each one of the first, second and third wavelength-specific limiter is activated by and is configured to limit the first, second and third wavelength, respectively, of the impinging light when the first, second and third wavelength, respectively, is above a predetermined threshold.

4. An impingement angle-independent wavelength-specific limiter, comprising: a stack of wavelength-specific limiters configured to limit impinging:
   a plurality of wavelength-specific limiters, each one of the plurality of wavelength-specific limiters being activated by a corresponding wavelength of the impinging light and being configured to limit the corresponding wavelength of the impinging light, wherein each one of the first, second and third wavelength-specific limiter is activated by and is configured to limit the first, second and third wavelength, respectively, of the impinging light when the first, second and third wavelength, respectively, is above a predetermined threshold, and wherein each one of the first, second and third wavelength-specific limiter are separated from each other by a reflecting layer configured to reflect up-converted light and an absorbing layer configured to absorb the up-converted light.

5. The limiter of claim 1, wherein each one of the first, second and third wavelength-specific limiter in the stack includes color tinted photochromic materials configured to be activated by and to limit the first, second and third wavelength, respectively, of the impinging light.

6. The limiter of claim 1, wherein the stack of wavelength-specific limiters is transparent to low light intensities and is configured to limit only the high intensity wavelengths of the impinging light, leaving the impinging light having intensities disposed in all other parts of the wavelength spectrum unchanged.

7. The limiter of claim 1, configured to limit high intensities beyond a predetermined threshold, while maintaining unchanged a picture quality at all other areas of the picture and spectral bands of light.

8. The limiter of claim 1, configured to limit impinging light having high intensities beyond a predetermined threshold and further configured to recover to full transparency after removal of the impingent light having high intensities beyond the predetermined threshold.

9. The limiter of claim 1, configured to limit impingent light having high intensities at any impingement angle, wherein the limiting is independent of the impingement angle of the light.

10. The limiter of claim 1, wherein the stack of wavelength-specific limiters is fabricated by a polymerizable composition of a matrix material, a color tintable photochromic material or a mixture of tintable photochromic materials and up-conversion nanomaterials configured to convert the impinging light having a strong wavelength into a wavelength absorbed by the tintable photochromic material or the mixture of tintable photochromic materials and up-conversion nanomaterials.

11. An impingement angle-independent wavelength-specific limiter, comprising: a stack of wavelength-specific limiters configured to limit impinging:
   a plurality of wavelength-specific limiters, each one of the plurality of wavelength-specific limiters being activated by a corresponding wavelength of the impinging light and being configured to limit the corresponding wavelength of the impinging light, wherein each wavelength-specific limiter element in the stack is separated from the other wavelength-specific limiter element in the stack by an absorbing layer configured to absorb up-converted light, while preserving a transparency of all the other stack elements but the specific wavelength element is designed for the high intensity applied light.

12. The limiter of claim 1, wherein the operation of the limiter is passive, and wherein no external power is required.

13. The limiter of claim 1, mounted in safety glass and/or filters to protect eyes and/or optical sights against laser dazzling in a plurality of predetermined wavelengths.

14. A method of limiting impinging light comprising:
   passing impinging light including first, second and third wavelength through an optical limiter, wherein at least one of the first, second or third wavelength has a power above a predetermined threshold;
   activating by the first wavelength of the impinging light a first wavelength-specific limiter;
   limiting by the first wavelength-specific limiter the first wavelength of the impinging light;
   activating by the second wavelength of the impinging light a second wavelength-specific limiter;
   limiting by the second wavelength-specific limiter the second wavelength of the impinging light;
   activating by the third wavelength of the impinging light a third wavelength-specific limiter; and
   limiting by the third wavelength-specific limiter the third wavelength of the impinging light, wherein the limiter is configured to limit only those wavelengths of the impinging light that are above a predetermined threshold, wherein the limiting is independent of the impingement angle of the impinging light.

15. An impingement angle-independent wavelength-specific limiter, comprising:
   a stack of impingement angle-independent wavelength-specific limiters configured to limit impinging light having a plurality of different wavelengths, the stack including:
      a first impingement angle-independent wavelength-specific limiter activated by a first wavelength of the impinging light and configured to limit the first wavelength of the impinging light;
      a second impingement angle-independent wavelength-specific limiter activated by a second wavelength of the impinging light and configured to limit the second wavelength of the impinging light; and,
      a third impingement angle-independent wavelength-specific limiter activated by a third wavelength of the impinging light and configured to limit the third wavelength of the impinging light,
   wherein each one of the first, second and third wavelength has an intensity above a predetermined threshold.

\* \* \* \* \*

UNITED STATES PATENT AND TRADEMARK OFFICE
CERTIFICATE OF CORRECTION

Page 1 of 1

PATENT NO. : 8,736,992 B2
APPLICATION NO. : 13/468220
DATED : May 27, 2014
INVENTOR(S) : Ofir et al.

It is certified that error appears in the above-identified patent and that said Letters Patent is hereby corrected as shown below:

In the Claims

On Column 7, Line 50 (Claim 4, Line 3), after "impinging", please insert -- light having a plurality of different wavelengths, the stack including: --.

On Column 8, Line 34 (Claim 11, Line 3), after "impinging", please insert -- light having a plurality of different wavelengths, the stack including: --.

Signed and Sealed this
Ninth Day of September, 2014

Michelle K. Lee
*Deputy Director of the United States Patent and Trademark Office*